364-434 SR
4/7/87 OR H 000,247

United States Statutory Invention Registration [19]

[11] Reg. Number: H247

Clark et al. [43] Published: Apr. 7, 1987

[54] ROLL MEASUREMENT SYSTEM FOR FLIGHT VEHICLE

[75] Inventors: Lee K. Clark, Santa Ana; Michael C. Peron, Eltoro; James A. Wes, Diamond Bar, all of Calif.

[73] Assignee: The United States of America as represented by the Secretary of the Army, Washington, D.C.

[21] Appl. No.: 887,496

[22] Filed: Jul. 11, 1986

[51] Int. Cl.[4] ..... G06F 15/50; G05D 1/08; G01C 23/00

[52] U.S. Cl. ..... 364/434; 318/585; 340/975

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

A roll measurement system for a flight vehicle, such as a tank-launched guided projectile or guided missile, includes a power source and a pulsed laser, such as a laser diode, which propagates a laser beam which is focused into a narrow conical beam and directed toward the earth. The laser beam's reflections from the earth are detected, for example, by a photo-diode, and converted into an analog electrical signal. The signal is converted to digital form and analyzed to determine its nadir (the shortest path-length to the earth). A microcomputer compares the immediate nadir determination with stored nadir determinations to compute the angle and rate of roll of the flight vehicle.

10 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ROLL MEASUREMENT SYSTEM FOR FLIGHT VEHICLE

GOVERNMENTAL INTEREST

The U.S. Government has an interest in this invention pursuant to Contract No. DAAA-09-77-C-2043 awarded by the Department of the Army.

BACKGROUND AND FIELD OF THE INVENTION

The present invention relates to vehicle flight guidance systems and more particularly to a system for the detection of the roll angle of guided missiles and other flight vehicles.

At the present time guided missiles and other flight vehicles are generally controlled by a three-axis gyro system which detects the pitch, yaw and roll (motion about the axis) of the flight vehicle. A gyro (automatic gyroscope) is a relatively complex, expensive and sensitive instrument. For example, it may include a moving body, a pick-off coil having fine wires and a shock protection system. When the guidance system is part of a tank-launched projectile system, it is required that it operate after prolonged storage and after being subjected to extended periods of shock and vibration due to movement of the tank over rough terrain. The gyroscope, since it is a relatively sensitive electro-mechanical system, is subject to failure due to adverse climatic storage conditions and the severe shock to which it may be subjected.

BRIEF DESCRIPTION AND OBJECTS OF THE INVENTION

It is an objective of the present invention to provide, in a flight vehicle, a roll angle detection and measurement system which is relatively low in cost and yet sufficiently accurate for its function.

It is a further objective of the present invention to provide such a roll detection and measurement system which is relatively rugged so that it will operate accurately even after being subjected to shock and vibration, for example from cross-country tank movements and storage under adverse conditions.

It is a feature of the present invention to provide a system for the determination of the roll angle and roll rate. The roll determination system is mounted on a flight vehicle such as a tank-launched guided projectile or guided missile. The roll determination system includes an electrical power source such as a battery and a pulsable laser means connected to the power source to propagate a pulsed laser beam. Preferably the beam is a conical beam in the range of ½ to 2 degrees, by the utilization of a focusing means to direct the laser beam from the laser means into a narrow beam adapted to be directed toward the earth when the vehicle is in flight.

The system further includes a laser beam receiver, such as a photo-diode, to detect and receive the reflections from the earth of said propagated laser beam and produce electrical signals in accordance therewith. Computation means is connected to the receiver to derive the roll angle and rate from the said electrical signals.

It is a further feature of the present invention to provide such a roll determination system which also includes false alarm reduction means to reduce the effect if the flight vehicle should turn its laser detector system toward the sun. The false alarm reduction means is connected between the receiver and the computation means and reduces noise by amplification of the receiver's dark noise (without detection of the reflected beams). The dark noise is rectified and filtered, from which an adaptible threshold electrical signal is derived. If the receiver sees the sun, for example, the receiver's dark noise increases which will cause the threshold signal to increase. This prevents the detection of false return signals.

It is a still further feature of the prevent invention that the computation means includes an analog to digital converter, digital memory storage means, and digital comparison means. The comparison means determines the greatest in amplitude of a series of pulses and derives the center of the pulse series.

BRIEF DESCRIPTION OF THE DRAWINGS

Other objectives and features of the invention will be apparent from the following detailed description of an embodiment of the invention, taken in conjunction with the accompanying drawings.

In the drawings.

DETAILED DESCRIPTION OF THE INVENTION

The present invention is described in the context of a guidance system for use with a tank-launched, small guided missile or tank-fired guided projectile. However, it will be understood that the roll angle determination system of the present invention may be applied to other types of guidance systems for flight vehicle, for example, to hand-fired guided missiles.

In general, the present invention is a roll direction system carried by the flight vehicle and powered by its internal power source, preferably a battery. The system includes a pulsed laser whose beam is in a radial propagation pattern and is focused toward the ground. A detector detects a portion of the reflected laser beam, through a narrow field-of-view (FOV) optical system. The system, by analog and digital analysis of the reflected beam, determines its center and, based on that center determination, analyzes the direction and degree of the vehicle's roll.

Figure 1A:
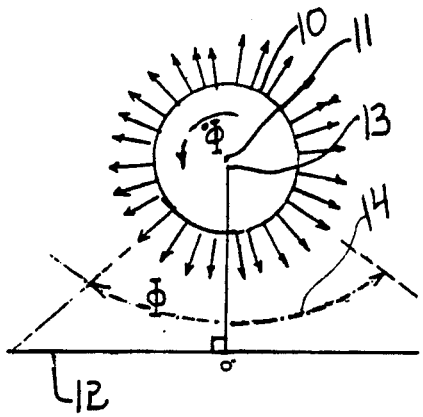
FIGS. 1A and 2A are front schematic views of the propagation path of the pulsed laser on the flight vehicle during the vehicle's flight.

As shown in FIG. 1A, the flight vehicle 10 is subject to roll at angle $\Phi$ about its imaginary central axis 11. The vehicle 10 is in flight above the surface of the earth 12, shown as flat in the idealized picture of FIG. 1A. The pulsed laser 13 propagates a laser beam toward the earth. The region of highest probability of the pulse's return, i.e., its reflection, is shown by arrow 14.

Figure 1B:
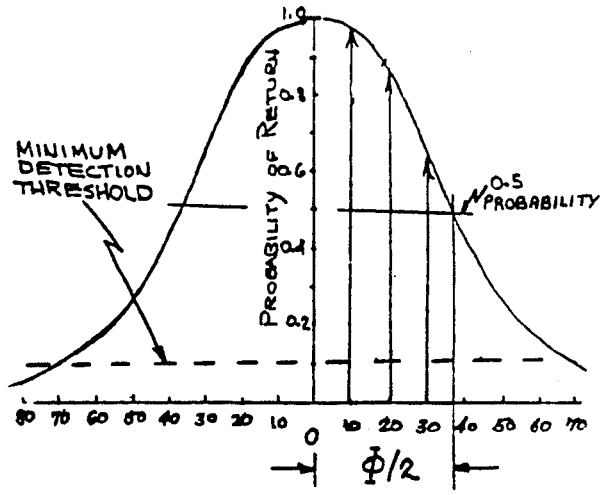
FIG. 1B is a graph illustrating the signals received from the ideal flat terrain of FIG. 1A.

As shown in FIG. 1B, the relative signal strength of the reflected laser beam varies with the angle between the flight vehicle 10 and the earth's surface 12. The highest probability of the refected wave is at the center, i.e., vertical to the earth when flat, as in FIG. 1A.

Stating the same concept, in other words, the greatest amplitude of the reflected wave is at the center, i.e., zero degrees. Typically, the 0.5 probability level is about 40 degrees from the center on both sides of the center.

Figure 2A:
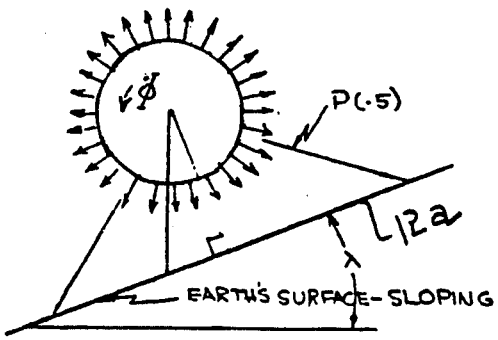
Figure 2B:
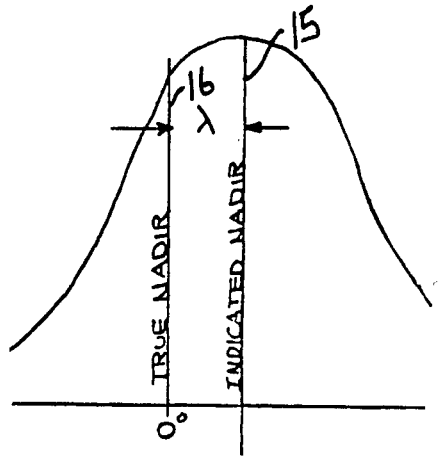
FIG. 2B is a graph illustrating the signals received from the sloping terrain of FIG. 2A.

When the earth's surface 12*a* is sloping, as in FIG. 2A, the shortest distance between the earth and the flight vehicle is not a true vertical. However, the system cannot, by itself, distinguish the case of a flat (horizontal) earth's surface, as in FIG. 1A, from that of a sloping earth's surface 12*a*, as in FIG. 2A. As shown in FIG. 2B the indicated nadir 15, provided by the system, differs from the true nadir 16 by the distance λ, which is determined by the slope of the earth's surface. If the guidance system guides the flight vehicle so that it has a zero degree of roll, based upon the determinations of the roll determination system of the present invention, the flight vehicle will have some extent of roll when flying over sloping earth's surface and substantially zero degree of roll over true horizontal earth's surface.

Figure 3:
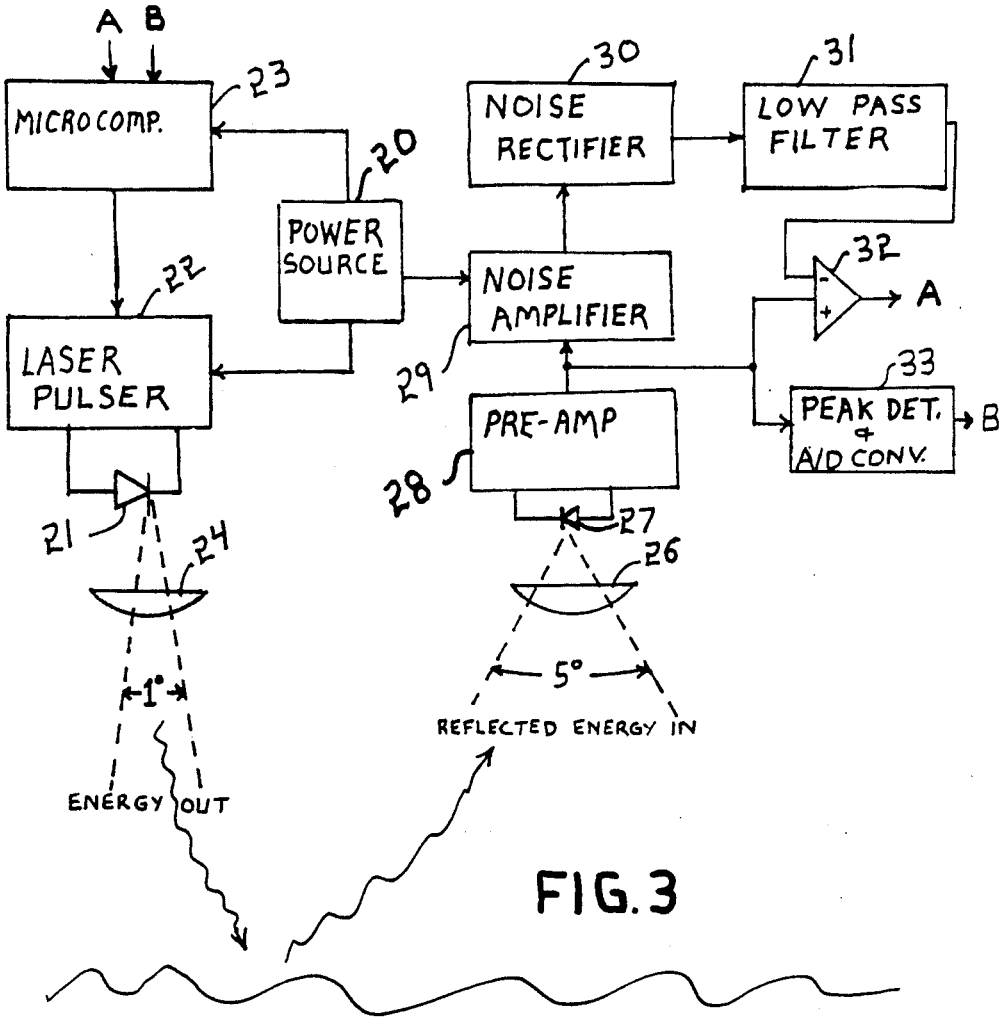
FIG. 3 is a schematic block diagram of the system of the present invention.

As shown in FIG. 3 the roll angle sensor system includes a power source 20, for example, a battery and a laser transmitter 21, preferably a laser diode which is controlled by the laser pulser circuit 22. A microcomputer 23 controls the fire command to the pulser circuit 22.

A suitable laser diode operates at 40 watts peak power with a 0.9-micrometer laser whose pulse width is 100 nanoseconds. The focusing lens 24 docuses the laser pulses from diode 21 to a conical laser beam in the range of ½ degree to 2 degrees and preferably 1 degree.

The earth reflects back a portion of the laser beam and the reflected laser beam is detected and analyzed by a receiver means herein after described of the system. A receiving focusing lens 26 scans a conical field-of-view (FOV) area of 2 to 8 degrees, preferably 5 degrees. The receiver laser beam is focused on a laser receiver, preferably photo-diode 27, which produces an electrical signal corresponding in amplitude to the received beam. The signal from photo-diode 27 is amplified in preamplifier 28 and its noise amplified by noise amplifier 29. The noise amplifier is connected to noise rectifier 30 which is connected to low pass filer 31. The output of low pass filter 31 is to comparator 32, preferably a high-speed differential amplifier.

The sun may momentarily be within the FOV of the detector which causes the Schott (background) noise to increase. Such noise cannot be eliminated by a fixed dc threshold since a fixed threshold would result in false ground returns. The sun effect problem is alleviated by amplifying the detector's noise by noise amplifier 29, rectifying it through rectifier 30 and then placing the rectified noise through a low-pass filter 31 whose first order roll-off is approximately 300 HZ. This process is basically an averaging of the peak noise present in the system, which results in a dc to 300-HZ threshold signal which is proportional to the system RMS (background) noise. The threshold signal adapts quickly (10 ms) to any change in the noise environment as the flight vehicle is rolling and encountering different background conditions. The received ground return reflected laser pulse is compared with the adaptive threshold, by comparator 32, resulting in a digital ground return pulse that is fed to the microcomputer 23. Additionally, the analog ground return pulse is peak detected by peak detector 33 and analog-to-digital (A/D) converter and fed to the microcomputer 23 digital storage, allowing the strength of reflected energy to be recorded.

The microcomputer 23 is programmed to analyze the data and to determine the flight vehicle's roll angle. Preferably, the roll angle is determined by analyzing the data using different methods and then combining the results. The methods are: (i) the relative signal strength of the received pulses; and (ii) the determination of the center of the received pulses.

Figure 4:
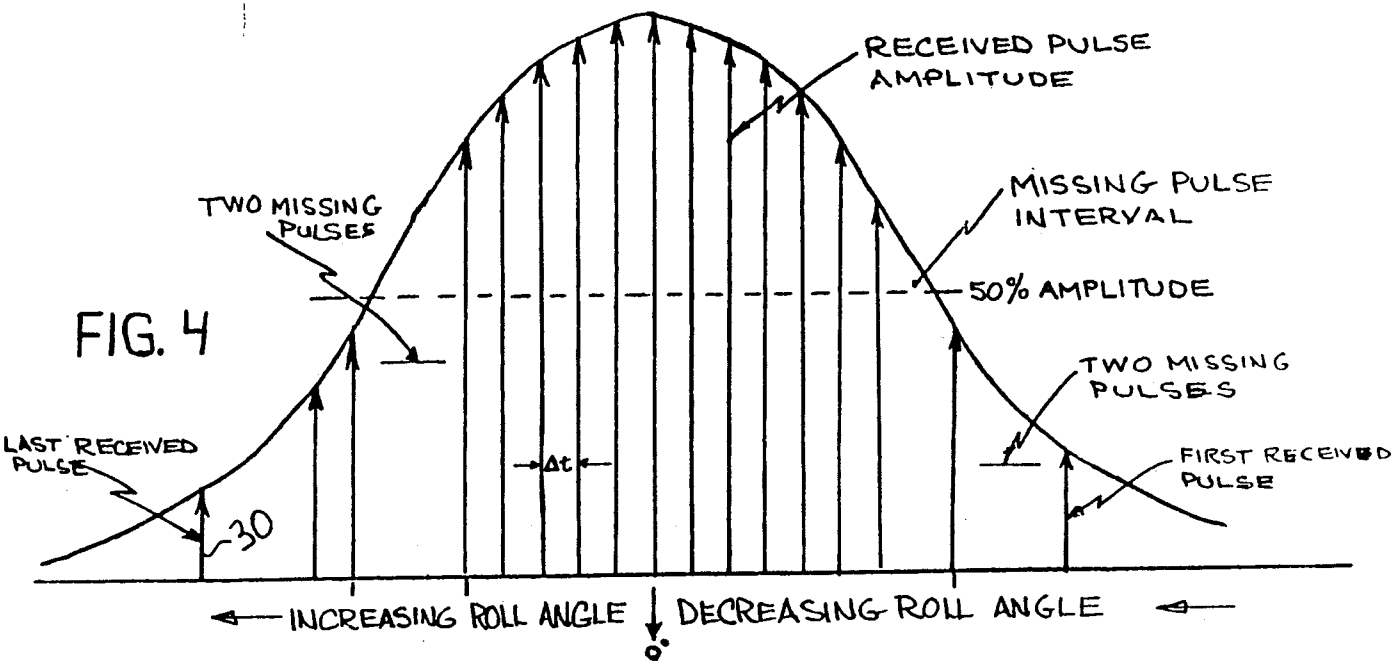
FIG. 4 is a graph illustrating the pulses produced during increasing and decreasing roll movements of the light vehicle.
Figure 5:
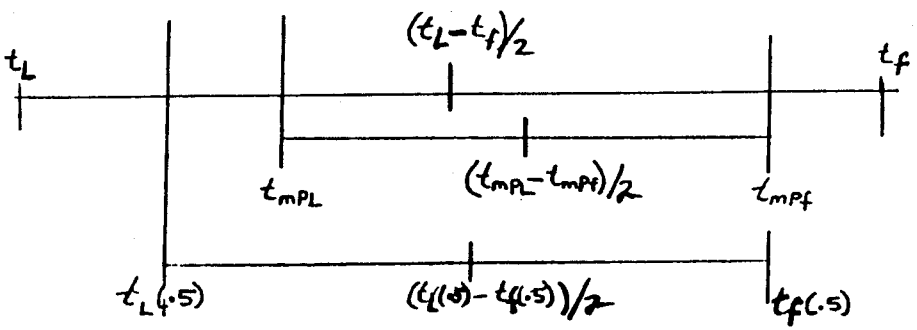
FIG. 5 is a chart illustrating the preferred nadir determination scheme.

The relative signal strength declines with increasing distance, i.e., its decline is the power of the total path length. The relative strength diminishes rapidly as the angle away from the indicated nadir increases. Converting the analog signal amplitudes into digital format enables the microcomputer to store such digital data, calculate the relative signal amplitudes and derive the center of the reception interval. As shown in FIG. 4, the digital pulse train is characterized by a series of vertical arrows 30 whose ordinate values are proportional to signal strength and whose time separations are inversely related to the transmitted pulse repetition rate. The subscribed times t are shown as being th first (f), last (L), two missing pulses (MP), and time of pulses just below the value equal to one-half the magnitude of the maximum pulse (.5). In general, the most reliable indication of the nadir is the amplitude comparison method; however, when the other two methods differ in solution to that derived by the amplitude method by more than three times Delta T (Δt) the solution is taken to be the average value of the three methods combined, as shown in FIG. 5.

After the nadir is calculated, it is stored in digital storage. The subsequent nadirs are determined in the same manner, and the roll rate in degrees per second is 360 divided by the intervals between successive nadirs. The roll angle is calculated by the microcomputer by a straight line extrapolation between roll cycles.

While the invention may have been described with respect to a particular embodiment or embodiments, the subject matter is deemed to also include all further substitutions, modifications and applications as will occur to one skilled in the art within the spirit and scope of the invention.

What is claimed is:

1. In a flight vehicle subject to roll about its axis, a system for the determination of the direction and degree of roll, the roll determination system including an electrical power source and a pulsable laser means connected to said power source to propagate a pulsed laser beam;

focusing means to direct said beam from said laser means into a narrow beam adapted to be directed toward the earth when the vehicle is in flight;

a laser beam receiver means to detect and receive the reflections from the earth of said propagated laser beam and produce electrical signals in accordance therewith; and computation means connected to said receiver means to derive the roll angle from the said electrical signals.

2. A roll determination system as in claim 1 wherein said flight vehicle is a tank-launched guided projectile.

3. A roll determination system as in claim 1 wherein said flight vehicle is a guided missile.

4. A roll determination system as in claim 1 wherein said pulsable laser means includes a laser diode transmitter and laser receiver.

5. A roll determination system as in claim 1 wherein said focusing means focuses said beam in a radial pattern and in a beam width in the range of ½ to 2 degrees.

6. A roll determination system as in claim 1 wherein said laser receiver means has a field-of-view in the range of 2 to 8 degrees.

7. A roll determination system as in claim 1 and further including noise reduction means connected between said receiver means and computation means to reduce noise by amplification of the transducers dark noise and without detection of the reflected beams, and rectifying and filtering said amplified dark noise.

8. A roll determination system as in claim 1 wherein said computation means includes an analog to digital converter, digital memory storage means, and digital comparison means to determine the greatest in amplitude of a series of pulses and to derive the center of said pulse series.

9. In a tank-launched guided flight vehicle subject to roll about its axis, a system for the determination of the direction and degree of roll, the roll determination system including:

an electrical power source and a pulsable laser means including a laser diode connected to said power source to propagate a pulsed laser beam;

a focusing means to direct said beam from said laser means into a narrow beam in the range of ½ to 2 degrees adapted to be directed toward the earth when the vehicle is in flight;

detection means to detect and receive the reflections from the earth of said propagated laser beam from a field-of-view in the range of 2 to 8 degrees and produce electrical signals in accordance therewith;

computation means connected to said detection means to derive the roll angle from the said electrical signals.

10. A roll determination system as in claim 9 wherein said computation means includes an analog-to-digital converter, digital memory storage means, and digital comparison means to determine the greatest in amplitude of a series of pulses and to derive the center of said pulse series.

* * * * *